(12) United States Patent
Walch

(10) Patent No.: US 9,781,882 B2
(45) Date of Patent: Oct. 10, 2017

(54) HARVESTING MACHINE COMPRISING AN IMPROVED LUBRICATION DEVICE

(71) Applicant: KUHN S.A., Saverne (FR)

(72) Inventor: Martin Walch, Dettwiller (FR)

(73) Assignee: KUHN S.A., Saverne (FR)

(*) Notice: Subject to any disclaimer, the term of this patent is extended or adjusted under 35 U.S.C. 154(b) by 29 days.

(21) Appl. No.: 14/331,569

(22) Filed: Jul. 15, 2014

(65) Prior Publication Data
US 2015/0052866 A1    Feb. 26, 2015

(30) Foreign Application Priority Data

Aug. 23, 2013  (FR) ..................... 13 58166

(51) Int. Cl.
*A01D 43/10* (2006.01)
*A01D 75/00* (2006.01)
*F16N 7/38* (2006.01)

(52) U.S. Cl.
CPC ........... *A01D 43/10* (2013.01); *A01D 43/105* (2013.01); *A01D 75/00* (2013.01); *F16N 7/38* (2013.01)

(58) Field of Classification Search
CPC .... A01D 43/10; A01D 43/105; A01D 34/035; A01D 34/125; A01D 34/49; A01D 34/56; A01D 34/58; A01D 34/76; A01D 75/00; A01D 82/00; A01D 82/02; A01D 37/04;

(Continued)

(56) References Cited

U.S. PATENT DOCUMENTS 1,910,599 A * 5/1933 Farmer ..................... F16N 7/38
                                                                 184/29
2,697,493 A * 12/1954 Kocher ................ B23Q 11/124
                                                                 184/6.14

(Continued)

FOREIGN PATENT DOCUMENTS

FR            2 751 166 A1    1/1998

OTHER PUBLICATIONS

French Preliminary Search Report and Written Opinion issued May 16, 2014, in Patent Application No. FR 1358166, filed Aug. 23, 2013 (with English Translation of Category of Cited Documents).

*Primary Examiner* — Robert Pezzuto
*Assistant Examiner* — Adam Behrens
(74) *Attorney, Agent, or Firm* — Oblon, McClelland, Maier & Neustadt, L.L.P.

(57) ABSTRACT

An agricultural machine includes a cutting mechanism and first and second conditioning elements driven by a transmission comprising a primary box including a first output connected to the cutting mechanism, a second output connected to the first conditioning element and a third output, connected with one another by primary transmission means, the transmission including a secondary box including an input connected to the third output and an output connected to the second conditioning element, connected with one another by secondary transmission means, the transmission comprising a lubrication device for the primary box with a pump and a primary distribution system for a lubricant towards the primary transmission means. The lubrication device comprises a secondary distribution system distributing the lubricant from the pump towards the secondary transmission means, and a return system for the lubricant from the secondary box towards the pump.

12 Claims, 8 Drawing Sheets

(58) Field of Classification Search
CPC .... A01D 69/12; A01D 41/1274; A01D 41/42; A01D 42/005; A01D 43/006; F16N 7/38
See application file for complete search history.

(56) References Cited

U.S. PATENT DOCUMENTS

| | | | | | |
|---|---|---|---|---|---|
| 3,006,123 | A * | 10/1961 | McCarty | | A01D 82/00 56/1 |
| 3,231,046 | A * | 1/1966 | Ohrnberger | | B23Q 11/121 137/565.34 |
| 3,596,445 | A * | 8/1971 | Lievers | | A01D 43/10 56/13.7 |
| 3,672,136 | A * | 6/1972 | Peacock | | A01D 43/10 56/14.4 |
| 3,722,191 | A * | 3/1973 | Braunberger | | A01D 34/28 56/189 |
| 3,729,907 | A * | 5/1973 | Burrough | | A01D 43/105 56/14.1 |
| 3,820,311 | A * | 6/1974 | Sawyer | | A01D 43/105 56/14.4 |
| 4,035,991 | A * | 7/1977 | Oosterling | | A01D 43/105 56/1 |
| 4,127,981 | A * | 12/1978 | Parrish | | A01D 69/00 56/14.4 |
| 4,216,641 | A * | 8/1980 | Koch | | A01D 43/105 56/14.4 |
| 4,270,338 | A * | 6/1981 | Halls | | A01D 43/10 56/14.4 |
| 4,446,678 | A * | 5/1984 | Smith | | A01D 43/10 56/1 |
| 4,516,392 | A * | 5/1985 | McLean | | A01D 43/10 56/16.4 R |
| 4,739,609 | A * | 4/1988 | Meier | | A01D 43/10 56/16.4 R |
| 4,896,484 | A * | 1/1990 | Jennings | | A01D 43/105 56/13.6 |
| 5,357,737 | A * | 10/1994 | Ermacora | | A01D 43/105 56/13.6 |
| 5,567,306 | A * | 10/1996 | DeWachter | | B01D 35/306 184/6.24 |
| 5,722,222 | A * | 3/1998 | Walters | | A01D 43/105 56/16.4 B |
| 5,768,865 | A * | 6/1998 | Rosenbalm | | A01D 43/10 56/13.6 |
| 5,778,644 | A * | 7/1998 | Keller | | A01D 41/142 56/11.2 |
| 5,992,133 | A * | 11/1999 | Walch | | A01D 43/105 56/16.4 B |
| 6,035,619 | A * | 3/2000 | Loehr | | A01D 34/76 56/13.6 |
| 6,273,214 | B1 * | 8/2001 | Schumacher | | F16H 57/043 184/6.12 |
| 6,425,232 | B1 * | 7/2002 | Desnijder | | A01D 43/086 241/101.763 |
| 6,668,531 | B2 * | 12/2003 | Wattron | | A01D 43/105 241/222 |
| 7,213,488 | B2 * | 5/2007 | Daniel | | A01B 71/06 74/416 |
| 7,937,918 | B1 * | 5/2011 | Mossman | | A01D 43/08 56/11.7 |
| 8,225,589 | B2 * | 7/2012 | Barnett | | A01D 34/668 56/13.6 |
| 2007/0079592 | A1 * | 4/2007 | Pruitt | | A01D 43/10 56/16.4 C |
| 2008/0066441 | A1 * | 3/2008 | Barnett | | A01D 34/668 56/14.7 |
| 2012/0031064 | A1 * | 2/2012 | Barnett | | A01D 34/668 56/157 |
| 2012/0168254 | A1 * | 7/2012 | Matousek | | F16H 57/0445 184/6.12 |
| 2012/0174550 | A1 * | 7/2012 | Pruitt | | A01D 43/105 56/10.6 |

* cited by examiner

HARVESTING MACHINE COMPRISING AN IMPROVED LUBRICATION DEVICE

BACKGROUND OF THE INVENTION

Field of the Invention

The present invention relates to an agricultural machine for the harvesting of plants comprising:
a chassis,
at least one harvesting mechanism connected to the chassis and comprising:
a cutting mechanism comprising cutting elements intended for cutting plants, and
a conditioning device comprising first and second contra-rotating conditioning elements liable to move away from one another and between which the plants cut by the cutting elements are intended to pass for their treatment,
a transmission mechanism intended to ensure the driving of the cutting elements and of the first and second conditioning elements, and comprising:
a primary box comprising:
a primary casing delimiting a primary inner volume,
an input shaft provided to be set in motion from a power source,
a first primary output connected to the cutting mechanism,
a second primary output connected to the first conditioning element,
a third primary output,
primary torque transmission means connecting with one another the input shaft, the first primary output, the second primary output and the third primary output, and housed within the primary casing,
a secondary box comprising:
a secondary casing delimiting a secondary inner volume,
a secondary input connected to the third primary output,
a secondary output connected to the second conditioning element,
secondary torque transmission means connecting with one another the secondary input and the secondary output, and housed within the secondary casing,
a lubrication device for the primary box comprising:
a fluid lubricant,
a pump sucking up the lubricant contained in the primary box,
a primary distribution system communicating with the primary inner volume and supplied with lubricant by the pump, by means of which primary distribution system the lubricant is distributed towards at least part of the primary torque transmission means.

Discussion of the Background

Such a machine is known from the document FR 2 751 166 A1. This machine comprises a harvesting mechanism which is composed of a frame carrying a cutting mechanism at the rear of which two pairs of contra-rotating conditioning elements extend. The conditioning elements of one pair are situated one above the other. One of them, in this case the lower conditioning element, is driven about a rotation axis which is fixed with respect to the cutting mechanism, whereas the upper conditioning element is mounted on a rotation axis which is movable with respect to the cutting mechanism so as to be able to allow a variable volume of cut plants to pass. A primary box extends between these two pairs of conditioning elements in a substantially central manner within the harvesting mechanism. This primary box ensures the driving, on one hand, of the cutting mechanism, by means of a first primary output situated at the front of the primary box, on another hand, of each lower conditioning element, by means of a respective second primary output. Each upper conditioning element is driven from a respective secondary box pivotably mounted on a respective lateral end of the harvesting mechanism. For this purpose, each secondary box comprises on one hand a secondary input connected, by means of a transmission shaft extending over the entire working width of the corresponding upper conditioning element, to a respective third primary output of the primary box, and on another hand a secondary output connected to the upper conditioning element. Furthermore, there is provided a lubrication device for the primary box operating with a fluid lubricant such as oil. This lubricant is in part set in motion by means of a pump housed in the primary box. This pump is connected to a primary distribution system formed by a duct, in particular a pipe, communicating with an upper end of the primary box so as to lubricate, by circulation of the lubricant in a closed circuit within the primary box, the primary torque transmission means contained in the primary box and extending over the height thereof, formed in particular by gears, shafts and bearings. The secondary box is a substantially sealed box which does not communicate with the primary box and which likewise contains a lubricant in order to lubricate the secondary torque transmission means contained in the secondary box.

This lubrication of the secondary box distinct from that of the primary box has a certain number of drawbacks.

The periodic operations of checking the quantity and/or of replacement of the lubricant are doubled, since they are required for each box. This multiplicity of maintenance operations is tedious for the user, increases the time that the machine is out of service, and increases the risk of omitting or neglecting the maintenance of one of the boxes.

Furthermore, the lubricant contained in the secondary box is confined inside of the inner volume of this secondary box, this inner volume is, however, of small size. The overall dimension of the secondary box is indeed greatly dictated by the distance between the rotation axis of the upper conditioning element on one hand, and the transmission shaft connected to the primary box on another hand. So as to limit the overall dimension of the harvesting mechanism, in particular in height, this distance is quite small, with the result of a reduced centre-to-centre distance between the secondary input and the secondary output of the secondary box. The overall dimension of the latter is also limited, in its lower part, by the very close presence of the rotational mounting means of the lower conditioning element on the frame of the harvesting mechanism. These various geometric constraints greatly reduce the size of the secondary box and therefore the heat exchange surface towards the ambient air through its walls. The secondary box in its entirety, and the lubricant which it contains, are therefore liable to be subject to a great heating during the work of the machine. In addition, in the case of a fluid lubricant in which the secondary torque transmission means are in part bathed, these geometric constraints reduce the inner volume of the secondary box, within which this lubricant can be distributed, and in particular the space between the secondary torque transmission means and the walls of the secondary box. There then arises a delicate compromise to be solved between, on one hand, a large quantity of lubricant in order to ensure a sufficient supply with lubricant of the secondary torque transmission means bathing in part in this lubricant, this large volume of lubricant in which the secondary torque transmission means paddle during their movement being able nevertheless to generate an excessive heating and an accelerated degradation of the lubricant by shearing and friction, and on another hand a reduced quantity of lubricant, which can nevertheless result in an insufficient lubrication under certain conditions. Furthermore, a fluid lubricant confined inside of the secondary box is projected on the internal walls of the box by the secondary torque transmission means in rotation. This phenomenon is liable to produce a lack of lubrication of these transmission means, because the lubricant can distribute itself, essentially, on the internal walls and not on the secondary torque transmission means. The problem of the supply with lubricant to the secondary torque transmission means, and also the heating of the lubricant and of the secondary box, arises acutely on a harvesting machine having a large working width and subjected to strict regulations dictating a reduced overall dimension during transport. The large working width requires bulky and heavy conditioning elements, between which a large flow of cut plants passes. This results in an increased mechanical power which the secondary box must transmit towards the corresponding conditioning element. Between the volume occupied by these conditioning elements and the total overall dimension of the machine, fixed in part by the legislator, in particular widthwise, the space remaining available for the secondary casing is reduced. In addition, inside of the latter, secondary torque transmission means dimensioned in an increased manner so as to resist the increased mechanical forces, tend to reduce the available volume for the lubricant. It then becomes difficult to ensure a suitable lubrication and cooling of the secondary box as a whole.

SUMMARY OF THE INVENTION

The present invention has the aim of proposing an agricultural machine for the harvesting of plants which does not have the above-mentioned drawbacks.

To this end, an important feature of the invention consists in that the lubrication device comprises on one hand a secondary distribution system which communicates with the secondary inner volume and is supplied with lubricant, directly or indirectly, by the pump, by means of which secondary distribution system the lubricant is distributed towards at least part of the secondary torque transmission means, and on another hand a return system for the lubricant contained in the secondary box, which communicates with the secondary inner volume and is intended to return, directly or indirectly, this lubricant towards the pump.

The primary box and the secondary box thus share the same lubricant, the circulation of which is ensured inside of each of these boxes by means of the pump connected to the primary and secondary distribution systems, as well as to the return system. Several advantages result from this design. On one hand, the periodic operations of checking the quantity and of replacement of the lubricant are simplified. Indeed, a single level of lubricant must be established, and checked from time to time, for the two boxes. In addition, the emptying of the lubricant is carried out simultaneously for the two boxes. On another hand, as the lubricant circulating in the secondary box also circulates in the primary box, the lubricant present in the secondary box is better cooled. The same applies for the secondary torque transmission means, which are therefore better able to transmit a great mechanical power. The level of lubricant can be established so that a relatively large overall volume of lubricant is available to ensure an adequate supplying with lubricant of the primary and secondary torque transmission means. However, the risk of seeing this lubricant degrade prematurely by heating and mechanical shearing, is greatly reduced because, during the operation of the machine, the lubricant is not stationary inside of the primary and secondary boxes but, on the contrary, circulates permanently therein. The lubrication of the secondary box by circulation of the lubricant makes it possible to design a secondary box of reduced dimensions. This enables the arrangement, within a machine for which the overall dimension during transport remains reduced, of conditioning elements having a large working width, in order to ensure an optimum treatment of the cut plants.

BRIEF DESCRIPTION OF THE DRAWINGS

Other features and advantages of the invention will emerge from the following description with reference to the attached drawings, which represent a non-restrictive embodiment of the machine according to the invention.

In these drawings.

DESCRIPTION OF THE PREFERRED EMBODIMENT

Figure 1:
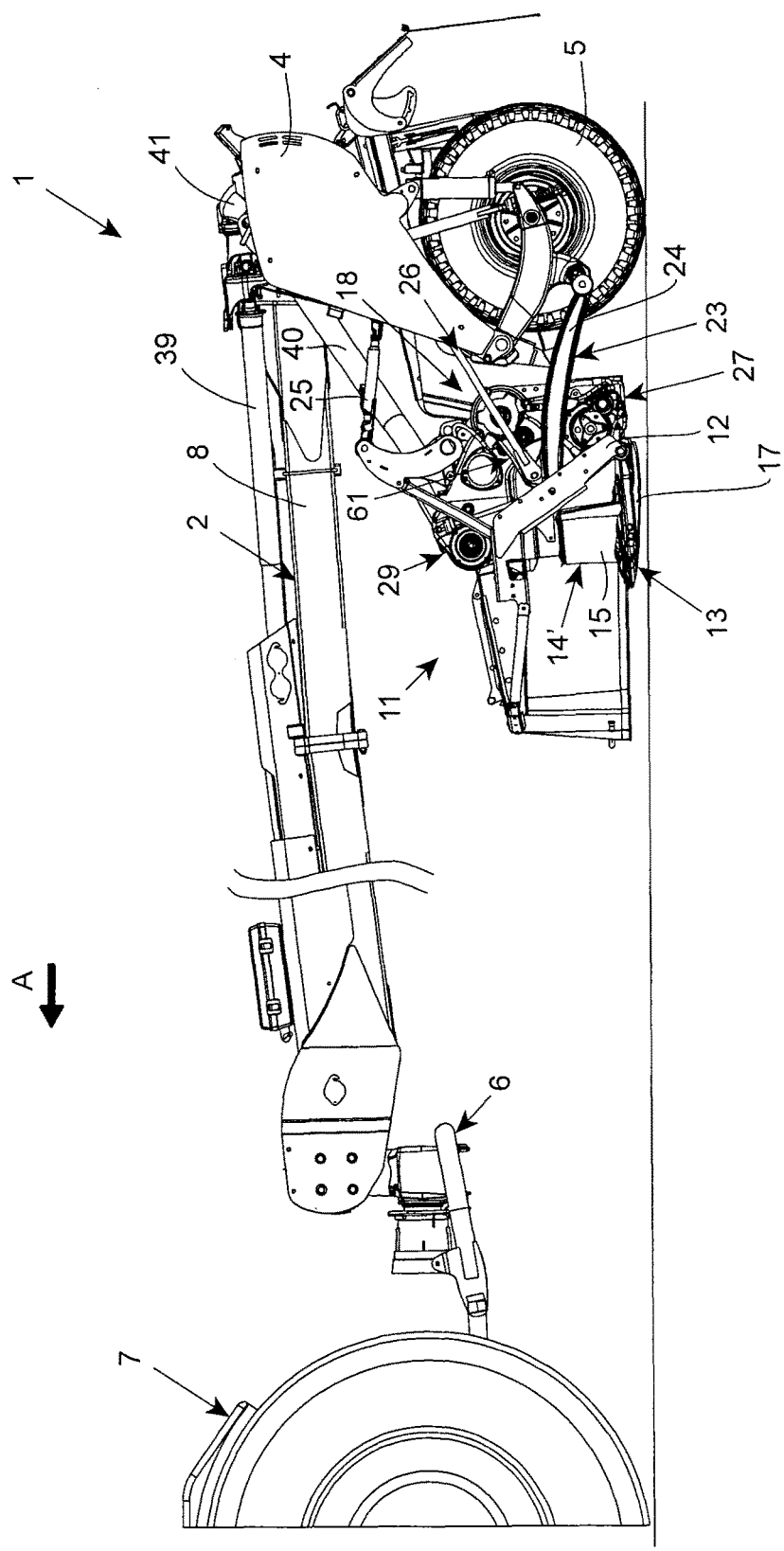
FIG. 1 represents a side view of an embodiment of a machine according to the invention, hitched to a tractor.
Figure 2:
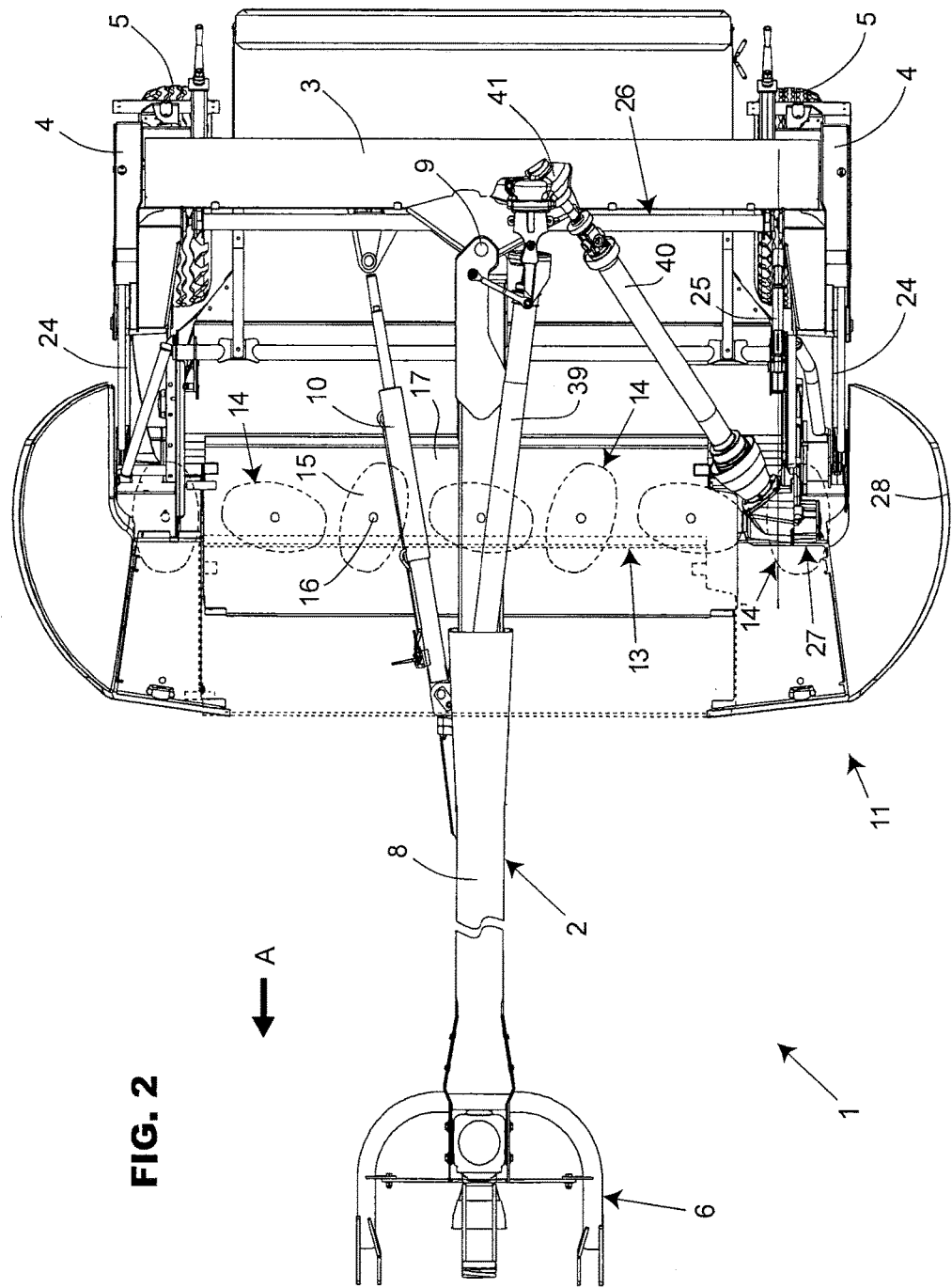
FIG. 2 represents a top view of the embodiment of FIG. 1.

As is represented in FIGS. 1 and 2, the machine according to the invention is an agricultural machine 1 for the harvesting of plants, in particular of fodder. The machine 1 comprises a chassis 2 having in particular a transverse beam 3. The chassis 2 also comprises two lateral posts 4. Each lateral post 4 is provided with at least one wheel 5 on the ground. The chassis 2 comprises a hitching device 6 allowing the chassis 2 to be hitched to a tractor 7, represented in FIG. 1, for moving the machine 1 in a direction of advance A and for driving the different elements of the machine 1. In the remaining description, the terms "front", "rear" and "frontal" are defined with reference to this direction of advance A, and the terms "horizontal", "vertical", "transverse", "above", "top", "bottom", "upper", "lower", "upwards", "downwards" and "beneath" relate to the machine 1 in work situation. In the embodiment of the figures, the hitching device 6 is placed at the level of a frontal end of the chassis 2. The chassis comprises a connecting means 8 such as a bar. This connecting means 8 connects the transverse beam 3 to the hitching device 6. This connecting means 8 is articulated on a substantially vertical axis 9 of the chassis 2. This connecting means 8 is movable about this axis 9 by means of a hydraulic jack 10. This is itself articulated on the chassis 2 and the connecting means 8.

The chassis 2 carries a harvesting mechanism 11. The harvesting mechanism 11 comprises a frame 12 carrying a cutting mechanism 13. The cutting mechanism 13 comprises cutting elements 14, 14' intended to cut the plants. The cutting elements 14, 14' are, for example, cutting rotors 15 able to turn about rotation axes 16 which, during work, are substantially vertical or slightly inclined towards the front. These cutting rotors 15 are formed by discs or drums provided with blades which extend beyond the periphery of the discs or drums. The cutting elements 14, 14' are mounted on bearings arranged at more or less regular intervals on a cutterbar 17 and are, in operation, carried in rapid rotation by means of a train of gears incorporated in a sealed casing containing a lubricant such as oil. By being set in rotation, the blades then come to cut the plants rising above the ground, such as grass or other forage plants. The casing of the cutterbar 17 is present in the form of an elongated parallelepiped. The harvesting mechanism 11 also comprises a conditioning device 18. The latter is placed at the rear of the cutting mechanism 13. The conditioning device 18 comprises first and second contra-rotating conditioning elements 19 and 20 able to move away from one another and between which the plants cut by the cutting elements 14, 14' are intended to pass, for their treatment, to be finally ejected towards the rear of the machine 1. Between the cutting mechanism 13 and the conditioning device 18, the cut plants follow a displacement direction SD indicated by the corresponding arrow in FIG. 3. According to the represented embodiment, and as can be seen from FIGS. 3 and 4, the conditioning element 19, 20 is a roller extending substantially horizontally and substantially perpendicularly to the direction of advance A. It comprises on its periphery grooves intended to collaborate with recesses of the adjacent roller. The first conditioning element 19 is mounted on a first rotation axis 21 fixed with respect to the cutting mechanism 13. During work, the first conditioning element 19 is driven about this first rotation axis 21 in a first rotation direction SR1 indicated by the corresponding arrow in FIG. 3. The second conditioning element 20 is situated substantially above the first conditioning element 19 and somewhat in front with respect to the latter. This second conditioning element 20 is mounted on a second rotation axis 22. During work, the second conditioning element 20 is driven about this second rotation axis 22 in a second rotation direction SR2, opposite to the first rotation direction SR1 and indicated by the corresponding arrow in FIG. 3. The second rotation axis 22 is mobile with respect to the cutting mechanism 13 and with respect to the first conditioning element 19. In this way, the distance separating these first and second rotation axes 21 and 22 can vary as a function of the volume of plants passing between the first and second conditioning elements 19 and 20.

The harvesting mechanism 11 is connected to the chassis by means of a suspension device 23 enabling a displacement in height of the harvesting mechanism 11 with respect to the chassis 2. As can be seen from FIGS. 1 and 2, this suspension device 23 is composed of two lower connecting rods 24 and at least one upper connecting rod 25. The lower connecting rods 24 are situated on the lateral sides of the machine 1 and are articulated on the harvesting mechanism 11 and on the chassis 2 by means of respective axes. The upper connecting rod 25 is more distant from the ground than the lower connecting rods 24 and is articulated on the harvesting mechanism 11 and on the chassis 2 by means of respective axes. These axes are all substantially horizontal and substantially perpendicular to the direction of advance A.

The machine 1 according to the invention also comprises a lightening device 26 for the harvesting mechanism 11, partially visible in FIG. 2. This lightening device 26 is constituted by two torsion bars which are connected to the transverse beam 3. Each of these torsion bars extends from the centre of the machine 1 to one of the lateral posts 4 of the chassis 2 and carries at its lateral end a mechanism which is directed towards the harvesting mechanism 11 and which is articulated by means of an axis on the lower connecting rod 24 of the suspension device 23. The two torsion bars ensure the lightening of the harvesting mechanism 11 at its two sides.

Figure 5:
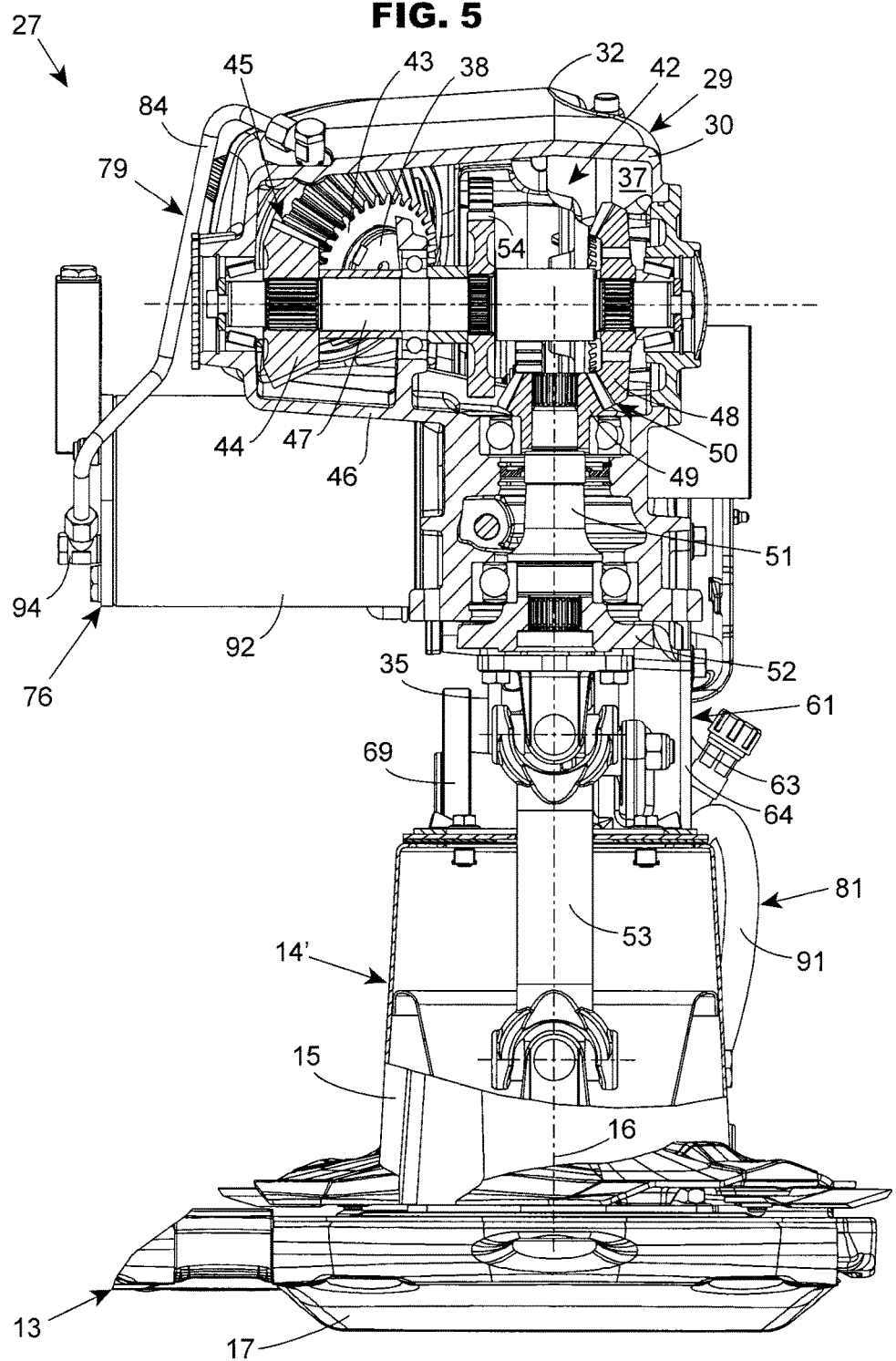
FIG. 5 represents a view from the front of the transmission mechanism along the section V-V of FIG. 3.
Figure 6:
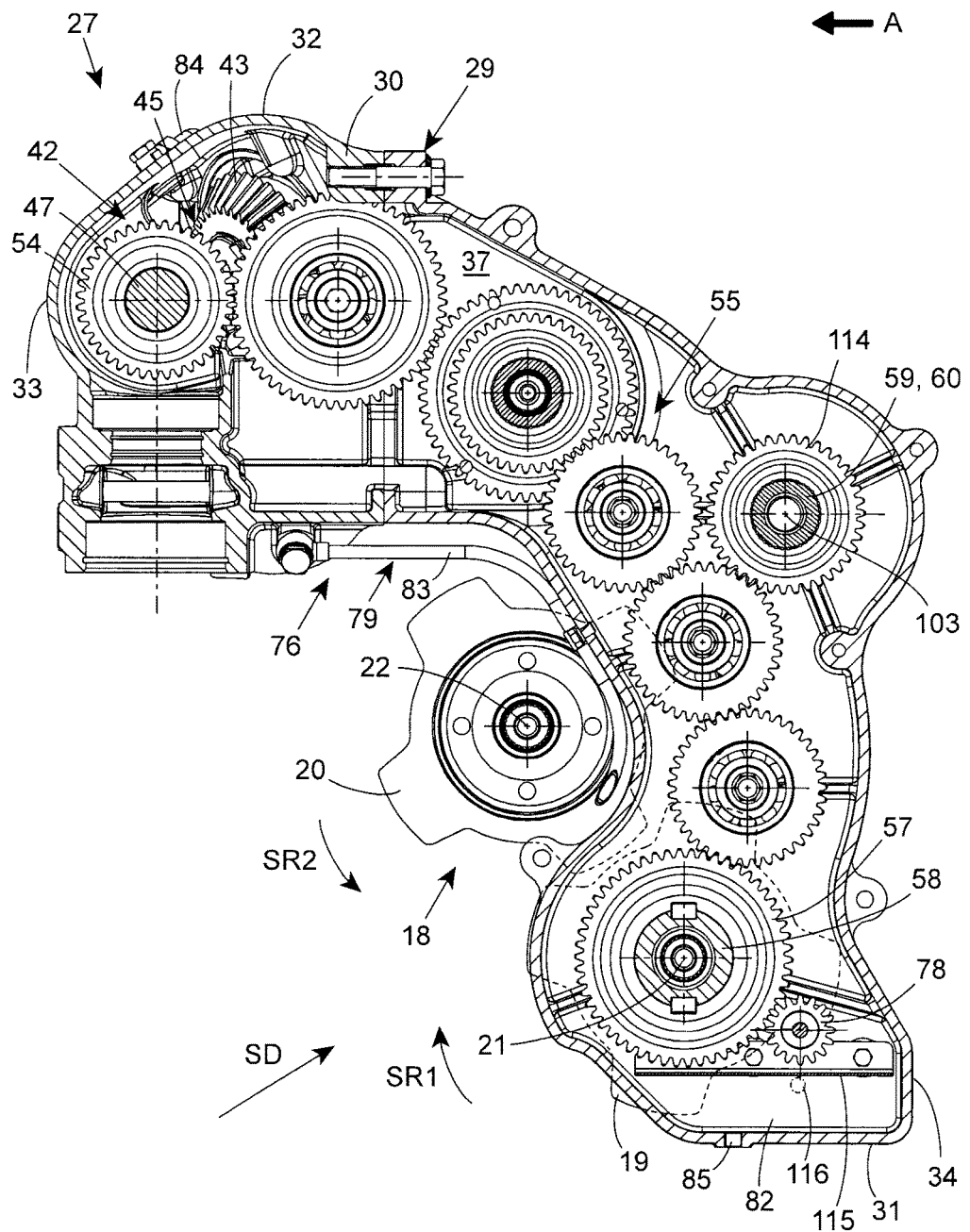
FIG. 6 represents a side view of the transmission mechanism along the section VI-VI of FIG. 4.

The machine 1 also comprises a transmission mechanism 27 intended to ensure the driving of the cutting elements 14, 14' and of the first and second conditioning elements 19 and 20. According to the embodiment represented in FIG. 2, the transmission mechanism 27 is situated in the proximity of a lateral end 28 of the harvesting mechanism 11. The transmission mechanism 27 comprises a primary box 29 represented on a larger scale in FIG. 3. The primary box 29 comprises first of all a primary casing 30. This primary casing 30 is, at least largely, a hollow casting. The primary casing 30 extends vertically between a lower primary end 31 and an upper primary end 32. The lower primary end 31 delimits the primary casing 30 at the bottom. The upper primary end 32 delimits the primary casing 30 at the top. In addition, the primary casing 30 extends horizontally and in the direction of advance A, between a front primary end 33 and a rear primary end 34. As can be seen from FIG. 4 showing the primary casing 30 from the rear, the latter extends horizontally and perpendicularly to the direction of advance A, for the most part between an inner primary side 35 close to the conditioning elements 19 and 20, and an outer primary side remote from the conditioning elements 19 and 20. The walls of this primary casing 30 delimit a primary inner volume 37 which is indicated in the sectional views of FIGS. 5 and 6 showing the interior of the primary box 29. As represented in FIG. 5, the primary box 29 comprises an input shaft 38 provided to be set in motion from a power source. The input shaft 38 is situated in the proximity of the upper primary end 32. It is, in addition, arranged somewhat at the rear of the front primary end 33. According to the embodiment of the figures, the input shaft 38 is set in motion from a power take-off of the tractor 7. The driving of the input shaft 38 will be better understood on examining FIG. 2. The power take-off of the tractor 7 can be connected to a first transmission shaft 39. This extends along a length of the connecting means 8. This first transmission shaft 39 is connected to a second transmission shaft 40 by means of a transfer gearbox 41. The transfer gearbox 41 is carried by the transverse beam 3 of the chassis 2. The transfer gearbox 41 is, for example, placed in the proximity of the substantially vertical articulation axis 9 of the connecting means 8. The second transmission shaft 40 extends, from the transfer gearbox 41, towards the front. It also extends downwards and towards the lateral end 28 of the harvesting mechanism 11 where the transmission mechanism 27 is situated. At this location, the second transmission shaft 40 is connected to the input shaft 38 of the primary box 29. Between the first transmission shaft 39 and the transfer gearbox 41 a universal joint, such as a cardan, is provided. The same applies between the transfer gearbox 41 and the second transmission shaft 40. The connection between the latter and the input shaft 38 is likewise operated by a universal joint. On examining FIGS. 5 and 6, it can be seen that the primary box 29 comprises primary torque transmission means 42. These latter comprise in particular a driving toothed input wheel 43 which meshes with a driven input gear 44. The toothed input wheel 43 is carried by the input shaft 38. This toothed input wheel 43 and this input gear turn in distinct planes arranged obliquely one with respect to the other, so as to form an input angle transmission 45. This input angle transmission 45 is situated substantially beneath the upper primary end 32, and immediately at the rear of the front primary end 33. The input angle transmission 45 is, furthermore, housed within a bulge 46 of the primary casing 30. This bulge 46 extends in projection from the inner primary side 35, over the harvesting mechanism 11. This bulge 46 delimits a cavity forming part of the primary inner volume 37. The input gear 44 is carried by an intermediate shaft 47 which extends substantially horizontally and substantially transversely. This intermediate shaft 47 carries a primary toothed wheel 48 which drives a primary gear 49. This primary toothed wheel 48 and this primary gear 49 turn in planes substantially perpendicular to one another, so as to form a primary angle transmission 50. The primary gear 49 is situated at the upper end of a first shaft 51 which extends downwards in the direction of the cutting mechanism 13 partially represented at the bottom of FIG. 5. The lower end of the first shaft 51 forms a first primary output 52 of the primary box 29. This first primary output is connected to the cutting mechanism 13 which is situated beneath it. For this purpose, the first primary output 52 comprises a coupling by means of which it is connected to the cutting element 14' of FIG. 5, placed in the proximity of the corresponding lateral end 28 of the harvesting mechanism 11. The connection between the first primary output 52 and this cutting element 14' is operated by a shaft with universal joints 53. In this case, the first primary output 52 is connected to the cutting element 14' closest to the lateral end 28. This cutting element 14' then transmits its rotational movement to the other cutting elements 14 via the train of gears incorporated in the casing of the cutterbar 17. As can be further seen from FIG. 5, the intermediate shaft 47 carries, between the input gear 44 and the primary toothed wheel 48, a toothed wheel 54. This meshes with a succession of primary meshing means 55, illustrated in FIG. 6, constituted by a train of toothed wheels extending towards the rear and towards the bottom of the primary box 29. These primary meshing means 55 extend towards the rear almost up to the level of the rear primary end 34, and substantially between the lower primary end 31 and the upper primary end 32. By means of these primary meshing means 55, the toothed wheel 54 drives a second primary output 56, represented in particular in FIG. 4, connected to the first conditioning element 19. For this purpose, the primary meshing means 55 of FIG. 6 comprise a terminal toothed wheel 57 situated above the lower primary end 31. This terminal toothed wheel 57 is carried by a second shaft 58 linked to the second primary output 56, according to an arrangement illustrated in further detail in FIG. 8. The second primary output 56 emerges from the primary casing 30, on the inner primary side 35 thereof. It is situated somewhat above the lower primary end 31. The second primary output 56 comprises a coupling by means of which it is connected directly to the first conditioning element 19. The primary meshing means 55 are also connected to a third primary output 59 of the primary box 29, the arrangement of which will be better understood on examining FIGS. 6 and 8. This third primary output 59 is linked to a third shaft 60 and emerges on the outer primary side 36 of the primary casing 30, in order to drive the second conditioning element 20 by means which will be described below. The third shaft 60 carries, in order to be driven in rotation, a toothed wheel 114 forming part of the primary meshing means 55. The input angle transmission 45, the primary angle transmission 50, the toothed wheel 54 and the primary meshing means 55 which it drives, and also the different shafts 38, 47, 51, 58 and 60 and the corresponding bearings, form the primary torque transmission means 42. These latter are therefore means for torque transmission by meshing. These primary torque transmission means 42 housed within the primary casing 30 connect with one another, in a synchronized manner, the input shaft 38, the first primary output 52, the second primary output 56 and the third primary output 59.

Figure 3:
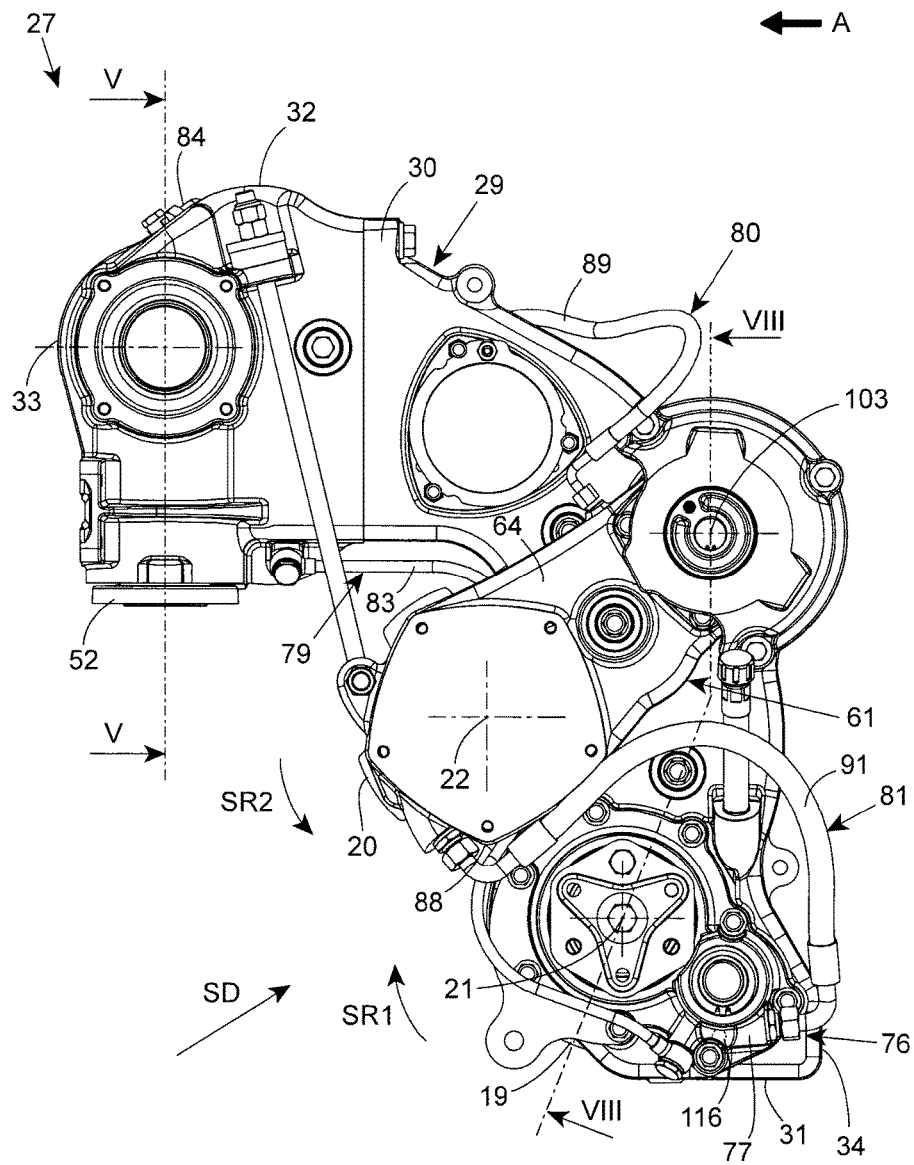
FIG. 3 represents a side view of a transmission mechanism equipping the embodiment of FIGS. 1 and 2.
Figure 4:
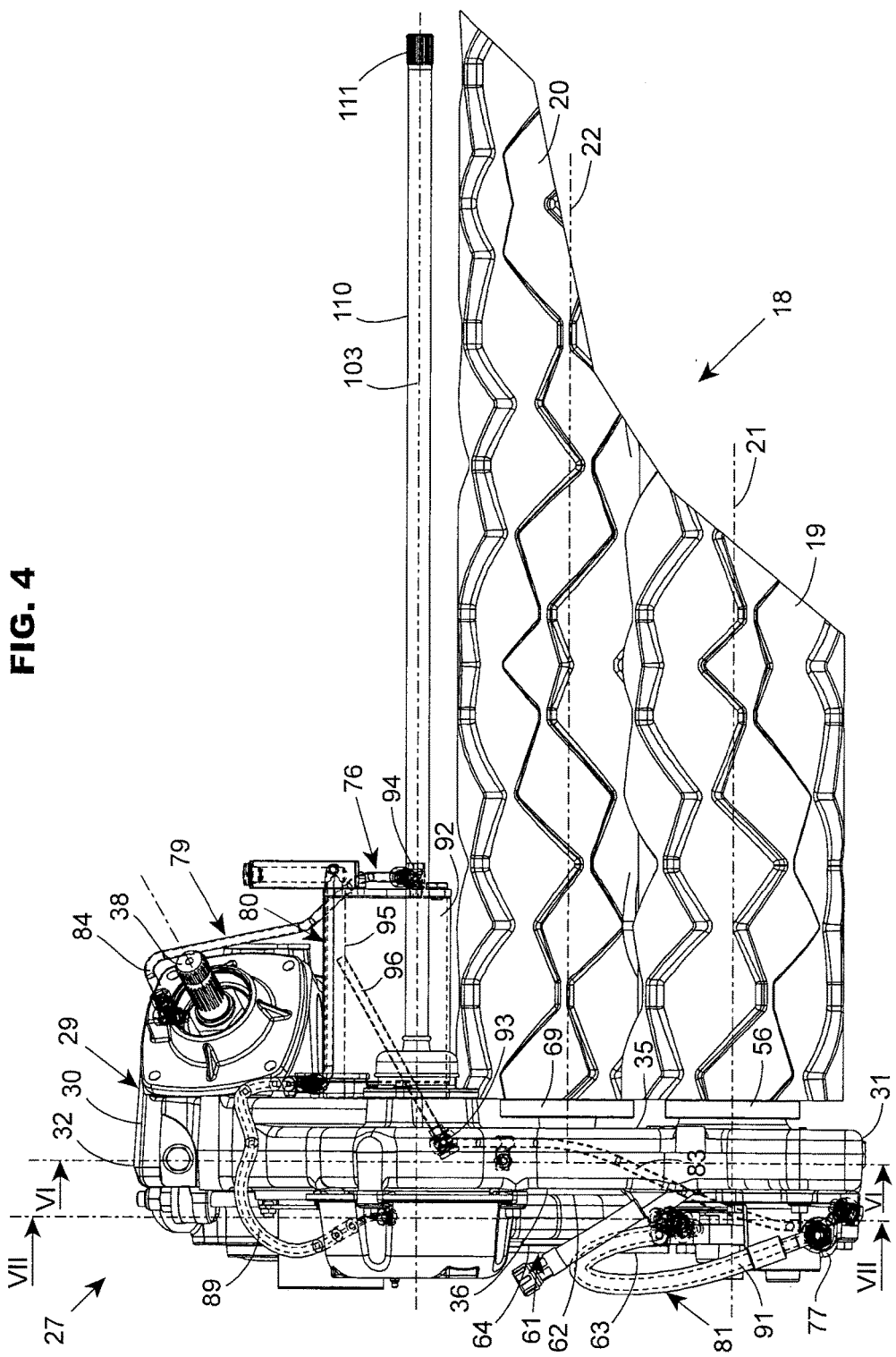
FIG. 4 represents a view from the rear of the transmission mechanism of FIG. 3.
Figure 7:
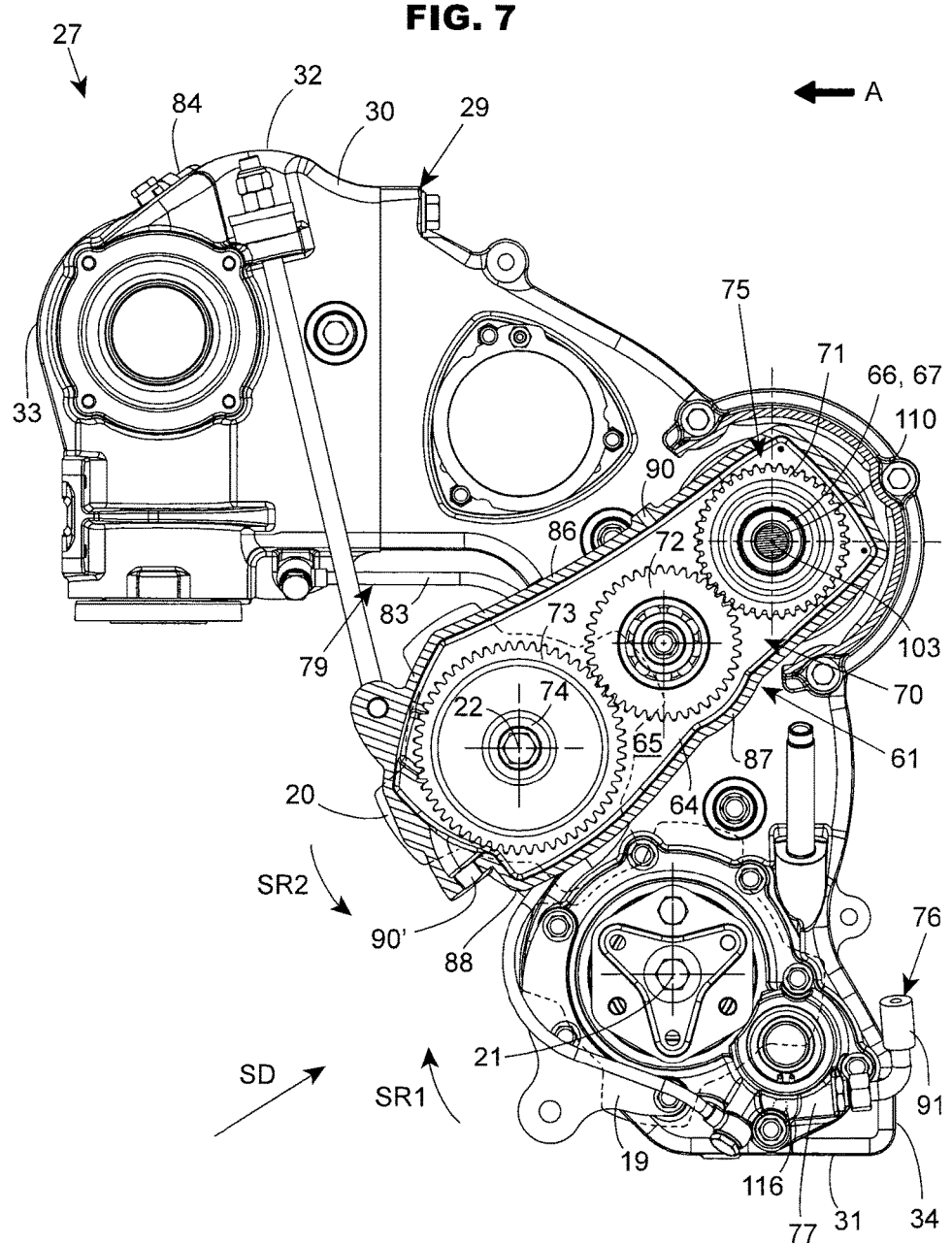
FIG. 7 represents a side view of the transmission mechanism along the section VII-VII of FIG. 4.

The transmission mechanism 27 also comprises a secondary box 61 represented from the exterior in FIGS. 3 and 4, and the interior of which is illustrated in particular in FIG. 7. Along a horizontal direction and perpendicular to the direction of advance A, the secondary box 61 extends essentially between an inner secondary side close to the outer primary side 36, and an outer secondary side 63 substantially parallel to the inner secondary side 62 and remote therefrom. The secondary box 61 is connected to the primary box 29 of the outer primary side 36 thereof. The secondary box 61 extends largely beside the primary box 29. The secondary box 61 comprises a secondary casing 64, the walls of which delimit a secondary inner volume 65. The secondary box 61 also comprises a secondary input 66 formed by a fourth shaft 67. This latter is connected to the third primary output 59. For this purpose, and as can be seen from FIG. 8, a transmission shaft 68 is provided connecting between them the third primary output 59 and the secondary input 66. This transmission shaft 68 extends substantially horizontally and substantially perpendicularly to the direction of advance A. According to the embodiment of the figures, the third shaft 60 forming the third primary output 59 and the fourth shaft 67 forming the secondary input 66 are coincident with the transmission shaft 68, the length of which corresponds substantially to the width of the transmission mechanism 27 comprised between the inner primary side 35 and the outer secondary side 63. The secondary input 66 transmits its rotational movement to a secondary output 69 of the secondary box 61 by secondary meshing means 70. For this purpose, the fourth shaft 67 forming the secondary input 66 carries a secondary toothed wheel 71 which meshes with an intermediate toothed wheel 72 housed in the secondary box 61. This intermediate toothed wheel 72 is engaged with another toothed wheel 73 carried by an output shaft 74 substantially parallel to the transmission shaft 68. The output shaft 74 extends from this other toothed wheel 73 in the direction of the second conditioning element 20. The end of the output shaft 74 close to the second conditioning element 20 forms the secondary output 69. This latter comprises a coupling by means of which the secondary output 69 is connected directly to the second conditioning element 20. As can be seen from FIGS. 4 and 8, the coupling connected to the first conditioning element 19 and the one connected to the second conditioning element 20 are situated substantially at the same transverse level with respect to one another. In the side view of FIG. 7, it can be seen that the secondary box 61 extends towards the front and downwards with respect to the transmission shaft 68. The toothed wheels 71, 72 and 73, the shafts 67 and 74 and the bearings contained in the secondary casing 64 form secondary torque transmission means 75. These latter are therefore means for torque transmission by meshing. The secondary torque transmission means 75 housed within the secondary casing 64 connect with one another, in a synchronized manner, the secondary input 66 and the secondary output 69. Thus the input shaft 38, the first primary output 52, the second primary output 56, the third primary output 59, as well as the secondary input 66 and the secondary output 69 are connected with one another in a synchronized manner. The first and second conditioning elements 19 and 20 are therefore driven in rotation in a synchronized manner with one another. This feature is advantageous for preventing a premature wear of the ribs of one of the conditioning elements 19 and 20 cooperating with the recesses of the other of the conditioning elements 19 and 20. The first and second conditioning elements 19 and 20 are, in addition, synchronized with the cutting elements 14, 14'.

The transmission mechanism 27 also comprises a lubrication device 76 for the primary box 29. This lubrication device 76 comprises in particular a pump 77, represented in particular in FIGS. 3 and 4, and a fluid lubricant such as oil. The pump 77 is an element which is distinct from the primary and secondary torque transmission means 42 and 75. It comprises an input chamber through which the lubricant is sucked up, and an output chamber in which the lubricant is pressurized. The pump 77 comprises a mobile part separating the input chamber from the output chamber. This mobile part is connected mechanically to the primary torque transmission means 42. For this purpose, the mobile part is linked to a gear 78, represented in FIG. 6, which meshes with the primary torque transmission means 42. In particular, this gear 78 meshes with the terminal toothed wheel 57. Thus, during the work of the machine 1, the pump 77 is driven by the primary torque transmission means 42 to which it is connected. The pump 77 sucks up the lubricant contained in the primary box 29. It is situated in a lower part of the primary box 29. It is situated in particular in the proximity of the lower primary end 31 and of the rear primary end 34. The lubrication device 76 comprises in addition a primary distribution system 79, represented in particular in FIGS. 3 and 4, which communicates with the primary inner volume 37 of the primary box 29. This primary distribution system 79 is supplied with lubricant by the pump 77 and distributes the lubricant towards at least part of the primary torque transmission means 42.

According to the invention, the lubrication device 76 comprises a secondary distribution system 80 visible in FIGS. 3 and 4. This latter communicates with the secondary inner volume 65 of the secondary box 61. The secondary distribution system 80 is supplied with lubricant by the pump 77. This supply can be direct or indirect. By means of this secondary distribution system 80, the lubricant is distributed towards at least part of the secondary torque transmission means 75. The invention is also characterized by the fact that the lubrication device 76 comprises a return system 81 for the lubricant contained in the secondary box 61. This return system 81 communicates with the secondary inner volume 65. It is intended to return the lubricant towards the pump 77. This return towards the pump 77 can be direct or indirect. The return system 81 is situated at a height above the ground lower than that of the secondary distribution system 80, so that during the operating of the machine 1, or during the stoppage of the latter, the lubricant conveyed in the secondary box 61 by the secondary distribution system 80 converges by gravity towards the return system 81.

According to an advantageous feature of the invention, the transmission mechanism 27 is vertically delimited by the lower primary end 31 and by the upper primary end 32 of the primary casing 30. In other words, the transmission mechanism 27 extends downwards to the lower primary end 31. It extends, in addition, upwards to the upper primary end 32. The lubricant fills a lower pocket 82 of the primary casing 30 delimited vertically, at the bottom, by the lower primary end 31. This lower pocket 82 is formed by the lower part of the primary casing 30 delimited towards the bottom by the lower primary end 31. This lower pocket 82 constitutes in this way a reserve of lubricant, in which the primary torque transmission means 42 situated immediately above the lower primary end 31 partly bathe during the operation of the machine 1 and when the latter is out of operation. During operation, the terminal toothed wheel 57 bathes partially in the lubricant. By its rotation, it conveys the lubricant towards a part of the primary torque transmission means 42 situated above it, in this case towards a part of the train of toothed wheels constituting the primary meshing means 55 of which the terminal toothed wheel 57 forms a part. When the machine 1 is out of operation, the level of lubricant filling this lower pocket 82 arrives substantially at the height of the geometric axis of the second primary output 56. During operation, the level of lubricant filling this lower pocket 82 is established beneath the level when out of operation. The level of lubricant filling the lower pocket 82 therefore remains relatively reduced, so that in operation, the heating of the lubricant and the losses of mechanical efficiency caused by paddling of the primary torque transmission means 42 in the lubricant, are greatly reduced. Furthermore, the pump 77 sucks up the lubricant filling the lower pocket 82. The pump 77 therefore sucks up the lubricant where it naturally returns by gravity. Thus, during a start-up of the machine 1 following a certain downtime, lubricant is immediately available for the pump 77. An advantageous feature of the invention makes provision, for this purpose, that the input chamber of the pump 77 is immersed in the lubricant filling the lower pocket 82. In particular, the input chamber of the pump 77 is situated beneath a horizontal plane passing through the geometric axis of the second primary output 56, so that the input chamber of the pump 77 is immersed in the lubricant.

Figure 8:
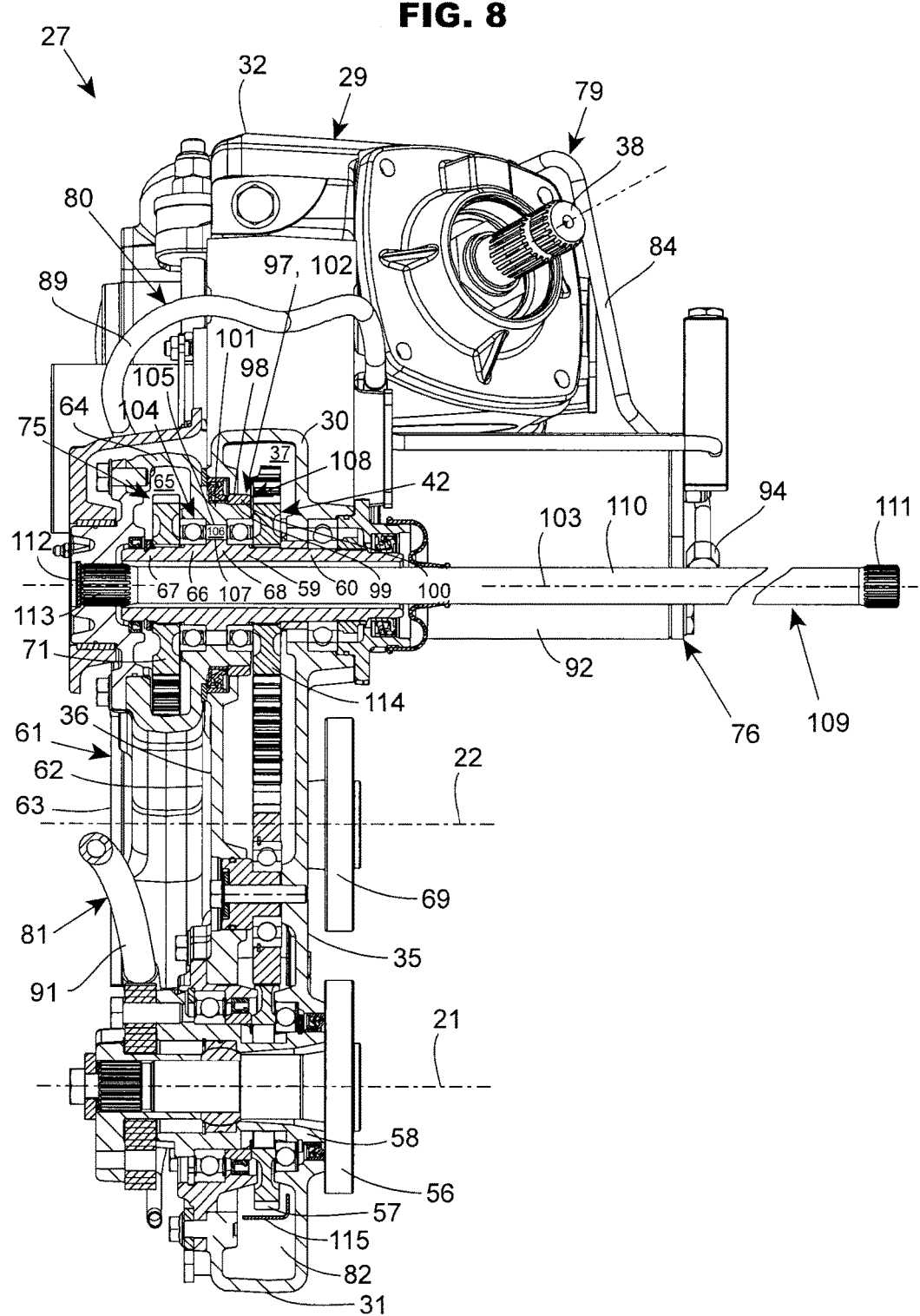
FIG. 8 represents a view from the rear of the transmission mechanism along the broken section VIII-VIII of FIG. 3.

According to an advantageous feature of the invention, visible in FIGS. 6 and 8, the primary box 29 comprises a deflector 115 arranged, within the primary inner volume 37, between the primary torque transmission means 42 and the lower primary end 31. In addition, the pump 77 sucks up the lubricant through an orifice 116 situated beneath the deflector 115. This orifice 116, represented diagrammatically in FIGS. 3 and 6, communicates with the input chamber of the pump 77. The deflector 115 is situated beneath the primary torque transmission means 42, in particular beneath the terminal toothed wheel 57. This deflector 115 also extends beneath the gear 78 ensuring the driving of the pump 77. The deflector 115 is, for example, a metal sheet fixed to a wall of the primary casing 30. The deflector 115 extends substantially horizontally. The deflector 115 extends within the lower pocket 82 which it separates into an upper zone situated above the deflector, in which the primary torque transmission means 42 are situated, and into a lower zone. This lower zone therefore extends vertically between the deflector 115 and the lower primary end 31. This lower zone forms a "rest zone" of the lubricant. Indeed, the deflector 115 shields the projections of lubricant generated by the primary torque transmission means 42 in rotation. In addition these latter are prevented from paddling in the lubricant present beneath the deflector 115. Furthermore, when, during work, the machine 1 progresses over an irregular terrain, as is often the case with a cutting machine of the mower type, the deflector 115 brakes the rocking movements of the lubricant present in the lower pocket 82. The arrangement of the orifice 116 beneath the deflector 115 then guarantees a secure and regular supply of the pump 77, without the risk of cavitation of the latter.

The primary distribution system 79 is composed of at least one duct, in particular of several ducts 83, 84. A duct is, for example, a pipe. This or these ducts 83, 84 communicate with the output chamber of the pump 77. They convey the lubricant turned back at the level of this output chamber. A first duct 84, visible in particular in FIG. 5, communicates with the primary inner volume 37 in the proximity of the upper primary end 32. This first duct 84 is connected to an end fitting oriented such that the lubricant circulating inside of this first duct forms, at the output of this end fitting, a jet directed between the toothed input wheel 43 and the input gear 44 which form the input angle transmission 45. The latter is thus cooled during the work of the machine 1. In addition, the rotation of the input toothed wheel 43 and of the input gear 44 causes the projection of lubricant in the whole of the upper part of the primary inner volume 37. In this way, the lubricant also reaches the primary angle transmission 50 as well as the toothed wheel 54 situated between this latter and the input angle transmission 45. Then, by projection against the other walls of the primary casing 30, and by mutual contacts of the gearings constituting the train of toothed wheels of the primary meshing means 55, the lubricant is distributed along the other primary torque transmission means 42 in rotation. It finishes by rejoining the lower part of the primary casing 30 delimited, at the bottom, by the lower primary end 31. Thus, according to an advantageous feature of the invention, during the operation of the machine 1, hence of the lubrication device 76, the lubricant circulates, at least substantially, between the lower and upper primary ends 31 and 32. In addition, the lubricant is distributed at least substantially between the front and rear primary ends 33 and 34. Between the upper primary end 32 and the lower pocket 82, the primary casing is substantially free of retention zones of the lubricant. The primary casing 30 is in particular, between the upper primary end 32 and the lower pocket 82, substantially free of zones liable to accumulate large quantities of lubricant, such as pockets or other zones forming a reservoir for the lubricant inside of the primary casing 30. In this way, the lubricant brought by the primary distribution system 79 at the level of the input angle transmission 45, is distributed towards the primary torque transmission means 42 and rejoins the lower part of the primary casing 30. This notable absence of retention zones induces that the quantity of lubricant "in transit" between the lower pocket 82 and the upper primary end 32 of the primary casing 30, is limited. The losses of mechanical efficiency due to this lubricant in transit are therefore reduced. In addition, the lower pocket 82, towards which the lubricant returns by gravity without, moreover, accumulating in a significant manner in the primary casing 30, forms a sufficient reserve of lubricant to ensure the supply of the pump 77. Finally, the notable absence of retention zones of the lubricant between the upper primary end 32 and the lower pocket 82, enables an almost complete emptying, and at one time, of the primary box 29, by means in particular of an emptying orifice 85 placed in the immediate vicinity of the lower primary end 31.

As can be seen in FIG. 7, the secondary casing 64 comprises in particular an upper wall 86 and a lower wall 87. The secondary casing 64 also comprises a lower secondary end 88 which delimits the lower wall 87 downwards. The secondary distribution system 80 comprises at least a second duct 89, in particular a pipe, communicating with the output chamber of the pump 77, in which the lubricant circulates which is turned back at the level of this output chamber. This second duct 89 communicates with the secondary inner volume 65 at the level of a first orifice 90 formed in the upper wall 86 of the secondary casing 64. This second duct 89 is connected to an end fitting oriented so that the lubricant circulating inside of this second duct 89 forms, at the output of this end fitting, a jet directed towards the secondary toothed wheel 71. By meshing with the intermediate toothed wheel 72 and the other toothed wheel which are housed in the secondary casing 64, this secondary toothed wheel 71 distributes the lubricant inside of the secondary box 61, towards the set of secondary torque transmission means 75. By gravity, a portion of the lubricant flows along the lower wall 87. The lubricant rejoins substantially the lower secondary end 88. In the vicinity thereof, the return system 81 for the lubricant contained in the secondary box 61 communicates with the secondary inner volume 65. For this purpose, the secondary casing 64 comprises a second orifice 90' situated in the immediate proximity of the lower secondary end 88. The return system 81 is connected to this second orifice 90'. This return system 81 comprises in particular a third duct 91, for example a pipe, connected to an end fitting fixed to the secondary box 61 at the level of the second orifice 90'. At its end remote from this end fitting, this third duct 91 is connected to another end fitting. This other end fitting can be fixed to the primary box 29, so that the lubricant circulating in the return system 81 is returned inside of the primary inner volume 37, in particular in the lower pocket 82 of the primary casing 30. In this case, this lubricant is indirectly returned towards the pump 77. Nevertheless, it can also be envisaged that the other end fitting is connected directly to the input chamber of the pump 77. In this case, the lubricant is directly returned towards the pump 77. This arrangement is the one provided in the embodiment of the figures. Thus, during the operation of the machine 1, the lubricant circulates permanently inside of the secondary box 61, and a level of lubricant is substantially prevented from being established inside of the secondary box 61. In this way, the secondary torque transmission means 75 are substantially prevented from paddling in the lubricant present in the secondary box 61. The lubrication and the cooling of these means are therefore optimal. The return, direct or indirect, of the lubricant from the secondary box 61 towards the pump 77, makes it possible to simultaneously empty the primary box 29 and the secondary box 61, by means of the emptying orifice 85 of the primary box 29.

According to an advantageous feature of the invention, the lubrication device 76 comprises a reservoir 92. The latter comprises at least one input 93 and at least one output 94. The reservoir 92 is connected to the pump 77 by means of a fourth duct 83 represented in totality in FIG. 4, and the view of which is partially concealed by the secondary box 61 in FIG. 3. The reservoir 92 is, in addition, connected to at least one of the primary and secondary distribution systems 79 and 80. This reservoir 92 is fixed on the inner primary side 35 in projection of which it extends, in the direction of the harvesting mechanism 11. This arrangement of the reservoir 92 prevents the latter from increasing the total width of the machine 1. In addition, the reservoir 92 extends above the second conditioning element 20, and above the rear part of the cutting mechanism 13. This positioning of the reservoir 92 in height on the transmission mechanism 27, somewhat apart from the conditioning elements 19 and 20 and the cutting mechanism 13, makes it possible to keep a harvesting mechanism 11 having a large width. The reservoir 92 enables the lubrication device 76 to contain a large total volume of lubricant. This makes it possible to ensure high flow rates of lubricant through the primary distribution system and the secondary distribution system 80. Thus, the primary and secondary torque transmission means 42 and 75 are supplied with lubricant in an optimum manner, and are cooled well. Furthermore, the reservoir 92 contains a large fraction, preferably between half and three quarters, of the total volume of lubricant contained in the lubrication device 76, which, at least during the operation of the latter, greatly reduces the remaining fraction present inside of the primary and secondary boxes 29 and 61. The problem is thus prevented of an excessive heating and of an accelerated degradation of the lubricant, on one hand by too great a paddling of the primary and secondary torque transmission means 29 and 61 in their respective primary and secondary casings 30 and 64, on another hand by shearing of the lubricant between these primary and secondary torque transmission means 29 and 61 and the walls of their respective primary and secondary casings 30 and 64. Finally, the reservoir 92 ensures an additional function of cooling of the lubricant by thermal exchange, with the ambient air, through its walls.

According to an advantageous feature of the invention, the input 93 of the reservoir 92 is connected to the pump 77, and the output 94 of the reservoir 92 is connected to at least one of the primary and secondary distribution systems 79 and 80. The input 93 is connected to the pump 77 by means of the fourth duct 83. Through its input 93, the reservoir 92 is filled, at least partially, by the lubricant sent by the pump 77. The fact of connecting the input 93 of the reservoir 92 to the output chamber of the pump 77 enables, during the operation of the machine 1, the supplying of the reservoir 92 by pressure of the lubricant turned back by the pump 77, and thus makes it possible to place the reservoir 92 relatively in height, as has been previously described.

According to another advantageous feature of the invention, the output 94 of the reservoir 92 is connected, on one hand, to the primary distribution system 79, by which output 94 this latter is supplied with lubricant, and on another hand to the secondary distribution system 80, through which output 94 this latter is supplied with lubricant. The first duct 84 coming to supply with lubricant the primary torque transmission means 42, in particular coming to lubricate the input angle transmission 45, is connected to the output 94. The second duct 89 coming to supply with lubricant the secondary torque transmission means 75 is likewise connected to the output 94. The fact of supplying each distribution system 79, 80 from the output 94 of the reservoir 92, brings about a lubrication in parallel of the primary box 29 and of the secondary box 61. Thus, the temperature of the lubricant conveyed by the primary distribution system 79, in the direction of the primary torque transmission means 42, is substantially identical to that of the lubricant conveyed by the secondary distribution system 80, in the direction of the secondary torque transmission means 75. This temperature is, furthermore, relatively moderate, given that the lubricant can cool inside of the reservoir 92, before leaving it. The lubrication in parallel also allows the distribution of the lubricant between the primary and secondary distribution systems 79 and 80 to be determined, so as to guarantee suitable flow rates of lubricant towards the primary and secondary torque transmission means 42 and 75.

According to an advantageous feature of the invention, the reservoir 92 is filled by overflow of the lubricant inside of the reservoir 92. This overflow is defined by an overflow level 95. The level of the lubricant contained inside of the reservoir 92 is always, at a minimum, substantially equal to this overflow level 95. "Always" is understood to mean whatever the situation of the machine 1, namely in operation or not. In order to obtain this filling by overflow, the reservoir 92 contains a pipe 96, illustrated in FIG. 4, the lower end of which communicates with the fourth duct 83 of the primary distribution system 79 connected to the pump 77. In this case, the input 93 of the reservoir is formed by this lower end. The pipe 96 comprises an upper end at the level of which the overflow level 95 is situated. During the operating of the machine 1, the lubricant originating from the driven pump 77 comes out from this pipe 96 again at the level of the upper end thereof, and the level of lubricant is greater than or equal to the overflow level 95. During operation, the lubricant originating from the pump 77 contains a certain proportion of air bubbles, which is explained by the mixing of the lubricant within the primary and secondary boxes 29 and 61. The principle of filling the reservoir 92 by overflow allows a large proportion of these air bubbles to separate themselves from the lubricant when the latter arrives at the level of the upper end of the pipe 96.

According to an advantageous feature of the invention, the primary and secondary distribution systems 79 and 80 each comprise a portion situated at a height above the ground greater than that which is presented by the overflow level 95. It can be seen in particular from FIG. 4 that at their output from the reservoir, the primary and secondary distribution systems 79 and 80 extend in part above the overflow level 95. Thus, the first duct 84 connecting the output 94 to the primary inner volume 37, extends for the most part above the overflow level 95. The second duct 89 connecting the output 94 to the secondary inner volume 65 extends above the overflow level 95. Owing to this positioning of the primary and secondary distribution systems 79 and 80 with respect to the overflow level 95, the level of the lubricant contained in the reservoir 92 remains, when the machine 1 is stopped, substantially equal to the overflow level 95. Thus, following a downtime of the machine 1, lubricant is rapidly conveyed from the output 94 of the reservoir 92 towards the primary and secondary torque transmission means 79 and 80. These latter thus do not undergo any damage due to a dry operation during the starting up of the machine 1. This effect is very advantageous on the machine 1 according to the invention which can remain immobilised for several months. A harvesting machine, in particular a cutting machine such as a mower illustrated in the figures is, for example, liable to be put away for the entire winter season.

According to an advantageous feature of the invention, the reservoir 92 has an inner volume liable to be totally filled by the lubricant during the operation of the lubrication device 76. In addition, the overflow level 95 corresponds to a volume of lubricant inside of the reservoir 92 representing a large part of this inner volume. This volume of lubricant represents at least half, preferably at least three quarters, of the inner volume. In this way, the reservoir 92 always contains a large volume of lubricant, available during the operation of the machine 1, or during starting up following a prolonged stoppage.

According to an advantageous feature of the invention which appears in FIG. 8, the transmission mechanism 27 comprises connecting means 97 which connect directly the secondary casing 64 to the primary casing 30. "Directly" is understood to mean that the casings 30 and 64 are placed, or substantially placed, one beside the other. The space between the outer primary side 36 of the primary casing 30 and the inner secondary side 62 of the secondary casing 64 is distinctly less than the respective widths of the casings 30 and 64. A compact transmission mechanism 27 is thus obtained, where the secondary casing 64 is situated as close as possible to the primary casing 30. These direct connecting means of the secondary casing 64 to the primary casing 30 enable a mobility of these two casings 30 and 64 with respect to one another, in particular in a plane which is substantially vertical and substantially parallel to the direction of advance A. Owing to this relative mobility of the primary and secondary casings 30 and 64, the return system 81 has an ability for deformation so as to accompany the movement of the secondary casing 64 with respect to the primary casing 30. The third duct 91 which the return system 81 comprises thus has a certain flexibility. It is, for example, a flexible pipe. In addition, for the same purpose of following the relative mobility of the primary and secondary casings 30 and 64, the return system 81 extends outside of these latter, i.e. beyond the primary inner volume 37 and the secondary inner volume 65. As represented in FIG. 8, the connecting means 97 comprise in particular a primary circular portion 98 of the primary casing 30 and a secondary circular portion 99 of the secondary casing 64. The connecting means 97 also comprise a ring 100 connecting the secondary circular portion 99 of the secondary casing 64 to the primary circular portion 98 of the primary casing 30. One 98 of these circular portions 98 and 99 is an inner circular portion, for example an inner circular bore, formed in a side of the corresponding casing 30. The other 99 of these circular portions 98 and is an outer circular portion, for example an outer circular journal, of a boss 101 which is comprised by the side of the other casing 64 close to the side of the casing 30. More precisely, the inner circular portion is an opening made in the outer primary side 36 of the primary casing 30. The outer circular portion is a circular journal which extends in projection from the inner secondary side of the secondary casing 64, in the direction of the second conditioning element 20. In addition, this outer circular portion extends in part inside of the inner circular portion from which it is radially separated by the ring 100.

Thus, and according to another advantageous feature of the invention, the secondary casing 64 is connected to the primary casing 30 by means of a pivoting connection 102. This latter comprises pivoting means 108. In the embodiment of the figures, these pivoting means 108 comprise the ring 100 previously described. The connecting means 97 which directly connect the secondary casing 64 to the primary casing 30 therefore advantageously comprise the pivoting connection 102. The pivoting connection 102 has a pivoting axis 103 substantially coincident with the geometric axis of the transmission shaft 68 connecting between them the third primary output 59 and the secondary input 66. The transmission shaft 68 is carried in particular by means for guiding in rotation 104 this transmission shaft 68 in the primary casing 30 and/or the secondary casing 64. In the embodiment of the figures, these means for guiding in rotation 104 are situated, along a direction parallel to the geometric axis, substantially at the same level as the direct connecting means 97 of the secondary casing 64 to the primary casing 30. In addition, these means for guiding in rotation 104 are inserted in a housing 105 of the primary 30 and/or secondary 64 casings which accommodates the transmission shaft 68. This housing 105 is formed within the connecting means 97 which connect directly the secondary casing 64 to the primary casing 30. This housing 105 is carried out in particular within the boss 101 which is comprised by the inner secondary side 62 of the secondary casing 64.

According to a particularly advantageous feature of the invention, the primary inner volume 37 of the primary box 29 and the secondary inner volume 65 of the secondary box 61 are set in communication with one another by means of an interface zone 106. This interface zone 106 separates them. It allows the lubricant present in the primary inner volume 37 or the secondary inner volume 65, to pass through it to rejoin the other of the primary inner volume 37 and secondary inner volume 65. This interface zone 106 enables the balancing of the respective air pressures within the primary box 29 and the secondary box 61. Thus, a single venting device, for example a breather, is required for the whole of the transmission mechanism 27, which simplifies the design thereof. In addition, this interface zone 106 takes the place of any sealing joints arranged between the primary inner volume 37 and the secondary inner volume 65 and preventing the lubricant from passing from one to the other. Here, also, this results in a simpler and less cumbersome design, in particular widthwise, i.e. along the geometric axis of the transmission shaft 68 connecting between them the third primary output 59 and the secondary input 66. During the operation of the machine 1, the lubricant is distributed essentially between the top and the bottom of each of the boxes 29 and 61, in particular from the respective distribution systems 79 and 80 to the input chamber of the pump 77. Only a reduced quantity of lubricant circulates between the primary and secondary inner volumes 37 and 65 via the interface zone 106.

According to an advantageous feature of the invention, the interface zone 106 extends, along a direction radial to the transmission shaft 68, from a periphery 107 of the transmission shaft 68 towards at least the housing 105 of the primary and/or secondary casings 30, 64 which accommodates the transmission shaft 68. Thus, provision is made to use the radial play between the transmission shaft 68 and its housing 105, which radial play is required so that the transmission shaft 68 can turn freely there about its geometric axis, to arrange there the interface zone 106. The realization of this interface zone 106 therefore does not require additional technical means which would come to complicate the realization of the transmission mechanism 27.

It is further advantageous that the interface zone 106 comprises at least part of the pivoting means 108 which the pivoting connection 102 comprises between the primary casing 30 and the secondary casing 64. Instead, or in addition, it can be advantageous that the interface zone 106 comprises the means for guiding in rotation 104 the transmission shaft 68 in the primary casing 30 and/or the secondary casing 64. Thus, the lubricant advancing through the interface zone 106 comes to lubricate the pivoting means 108 and/or means for guiding in rotation 104. The circulation of the lubricant through the interface zone 106 creates a dynamic lubrication of the above-mentioned means 104 and 108, the cooling of which is thus improved at the same time as their wear is reduced. In the embodiment of the figures, the interface zone 106 comprises the means for guiding in rotation 104 which are formed by at least one bearing, in particular a rolling bearing, comprising for example two roller bearings. The lubricant can thus advance through the bearing, in particular through the rolling bearing, in this case between the rolling elements which this rolling bearing comprises.

According to an advantageous feature of the invention, the transmission shaft 68 is a hollow shaft, inside of which a return means 109 extends. As illustrated in FIGS. 4 and 8, this latter is connected on one hand to the frame 12 of the harvesting mechanism 11, and on another hand to the secondary casing 64. The return means 109 tends to bring the second conditioning element 20 close to the first conditioning element 19 such that, during the operation of the machine 1, the conditioning elements 19 and 20 tend to compress the plants which pass between them. Nevertheless, this return means 109 comprises the ability to allow the first and second conditioning elements 19 and 20 to move away from one another sufficiently when a dense bundle of mown plants passes between them. The return means 109 comprises a bar 110 which crosses the transmission shaft 68. A first end 111 of the return means 109 is linked to the frame 12 of the harvesting mechanism 11. A second end 112 of the return means 109 is fixed to the secondary casing 64 by means of immobilisation in rotation 113 about the geometric axis of the transmission shaft 68. In particular, these means of immobilisation in rotation 113 link the secondary casing 64 to the bar 110 of the return means 109. These means of immobilisation in rotation 113 are, for example, grooves. The geometric axis of the bar 110 of the return means 109 is substantially coincident with that of the transmission shaft 68. Thus, this bar 110 is substantially concentric to the latter. In addition, the geometric axis of the bar 110 is substantially coincident with the pivoting axis 103 of the pivoting connection 102, about which pivoting axis 103 the secondary casing 64 can pivot with respect to the primary casing 30. The bar 110 is, for example, a torsion bar. This torsion bar is connected by the first end 111 to the frame 12 of the harvesting mechanism 11, and by the second end 112 to the secondary casing 64. This design of the return means 109 extending, at least in part, inside of the transmission mechanism 27, in particular inside of the hollow transmission shaft 68, brings lightness and compactness to the transmission mechanism 27.

The machine for harvesting fodder according to the invention is, in particular, a mower-conditioner of the type comprising a chassis carried by wheels on the ground and comprising a bar so as to be towed by a towing vehicle. Nevertheless, a machine according to the invention, such as a mower-conditioner, can also comprise a chassis carried by the three-point hitching device of a tractor, such a machine being able to be carried at the front or at the rear of the tractor. A machine according to the invention can comprise several harvesting mechanisms, for example two harvesting mechanisms placed on either side of a central chassis. Finally, a machine according to the invention can be a self-propelled mower-conditioner.

Of course, the invention is not limited to the embodiment described and represented in the attached figures. Modifications remain possible, in particular as regards the constitution, the arrangement or the number of the various elements, by different combination of the above-mentioned features, or by substitution of technical equivalents without, however, departing from the scope of protection of the invention.

What is claimed as new and desired to be secured by Letters Patent of the United States is:

1. Agricultural machine for the harvesting of plants comprising:
    a chassis,
    at least one harvesting mechanism connected to the chassis, the harvesting mechanism comprising:
        a cutting mechanism including cutting elements intended for cutting plants, and
        a conditioning device including first and second contra-rotating conditioning elements,
    a transmission mechanism intended to ensure the driving of the cutting elements and of the first and second conditioning elements, the transmission mechanism comprising:
        a primary box comprising a primary casing delimiting a primary inner volume and primary torque transmission means,
    a lubrication device for the primary box comprising:
        a pump configured to suck up lubricant contained in the primary box,
        a reservoir connected to the pump and configured to be at least partially filled by the lubricant sent by the pump,
        a primary distribution system communicating with the primary inner volume and supplied with lubricant by the pump, by means of which primary distribution system the lubricant is distributed towards at least part of the primary torque transmission means,
    wherein the pump is spaced apart from the reservoir,
    wherein the pump is situated in a lower part of the primary casing,
    wherein an inside of the reservoir is filled by overflow of the lubricant,
    wherein a level of overflow lubricant inside of the reservoir is configured to be maintained at least at a desired overflow level,
    wherein the reservoir has an inner volume configured to be totally filled by the lubricant during the operation of the lubrication device, and
    wherein the overflow level corresponds to a volume of lubricant inside of the reservoir representing at least half of this inner volume.

2. Machine according to claim 1, wherein the transmission mechanism is vertically delimited by a lower primary end of the primary casing and by an upper primary end of the primary casing, and the pump sucks up the lubricant filling a lower pocket of the primary casing delimited vertically, at the bottom, by the lower primary end.

3. Machine according to claim 1, wherein the primary box comprises a deflector arranged, within the primary inner volume, between the primary torque transmission means and a lower primary end, and the pump sucks up the lubricant through an orifice situated beneath the deflector.

4. Machine according to claim 2, wherein during the operation of the machine, the lubricant circulates, at least substantially, between the lower and upper primary ends of the primary casing, and between the upper primary end and the lower pocket, the primary casing is substantially free of retention zones of the lubricant.

5. Machine according to claim 1, wherein the lubrication device further includes a secondary distribution system that is configured to be supplied with lubricant, directly or indirectly, by the pump, and
    wherein the reservoir includes at least one input and at least one output, and the reservoir is connected to at least one of the primary and secondary distribution systems.

6. Machine according to claim 5, wherein the input of the reservoir is connected to the pump, by which input the reservoir is, at least partially, filled by the lubricant sent by the pump, and the output is connected to at least one of the primary and secondary distribution systems.

7. Machine according to claim 5, wherein the output of the reservoir is connected to the primary distribution system, by which output the primary distribution system is supplied with lubricant, and to the secondary distribution system, by which output the secondary distribution system is supplied with lubricant.

8. Machine according to claim 1, wherein the primary distribution system and a secondary distribution system of the lubrication device each comprise a portion situated at a height above the ground greater than that which is presented by the overflow level.

9. Machine according to claim 5, wherein the reservoir is positioned above the second conditioning element and above a secondary casing of a secondary box.

10. Machine according to claim 9, wherein the secondary casing includes a lower secondary end in the vicinity of which a return system for the lubricant contained in the secondary box communicates with a secondary inner volume.

11. The agricultural machine according to claim 1, wherein a passage for the lubricant is in fluid communication with an output chamber of the pump and an input of the reservoir.

12. The agricultural machine according to claim 1, wherein the reservoir is positioned along an intermediate height of the transmission mechanism and below a top surface of the transmission mechanism.

\* \* \* \* \*